J. S. McWHIRTER.
CAR BRAKE.
APPLICATION FILED SEPT. 30, 1908.
919,746.
Patented Apr. 27, 1909.
2 SHEETS—SHEET 1.
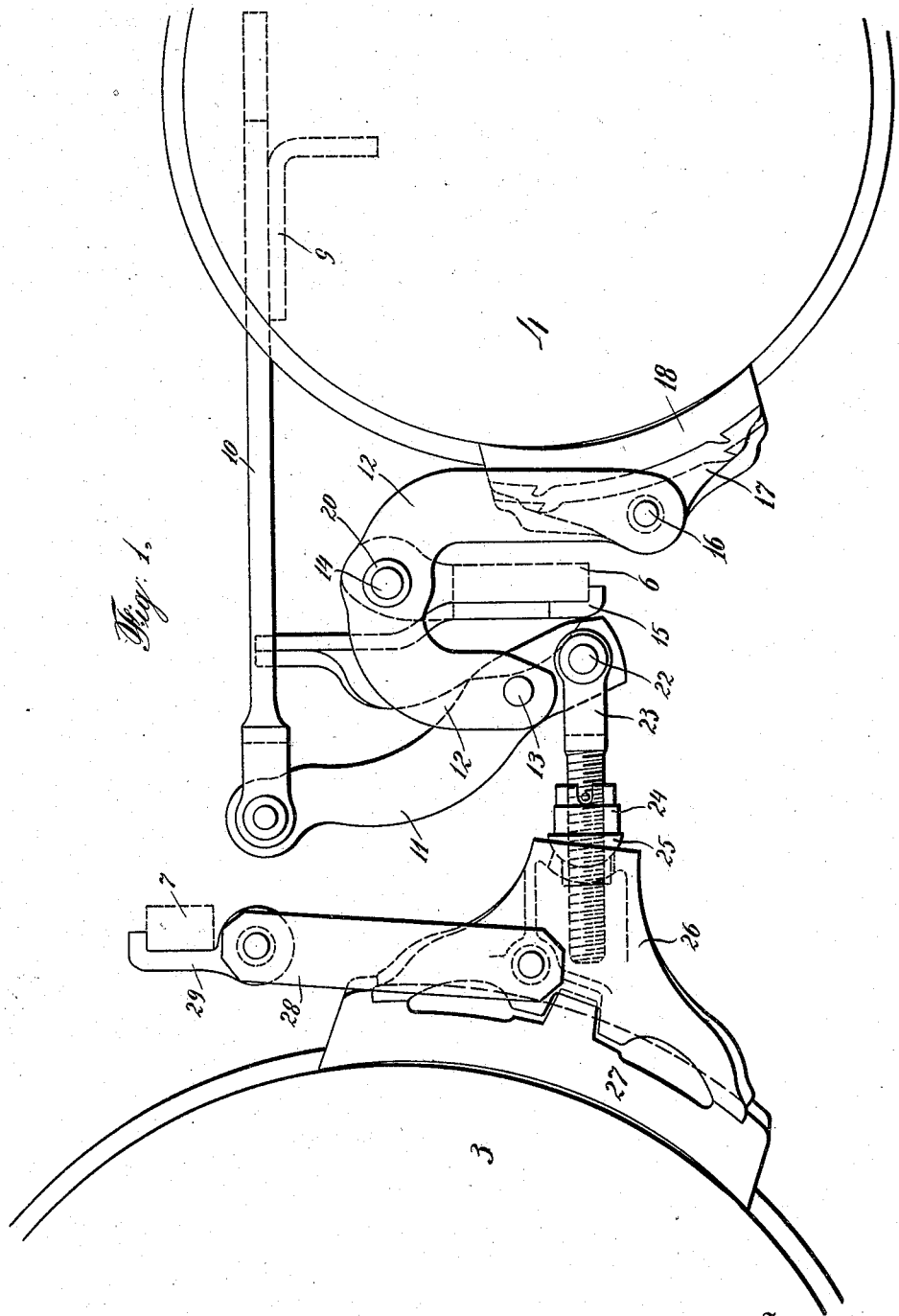
Witnesses:
M. Gaertner
J. Luttinger
Inventor
John S. McWhirter
By his Attorney
Joseph L. Levy

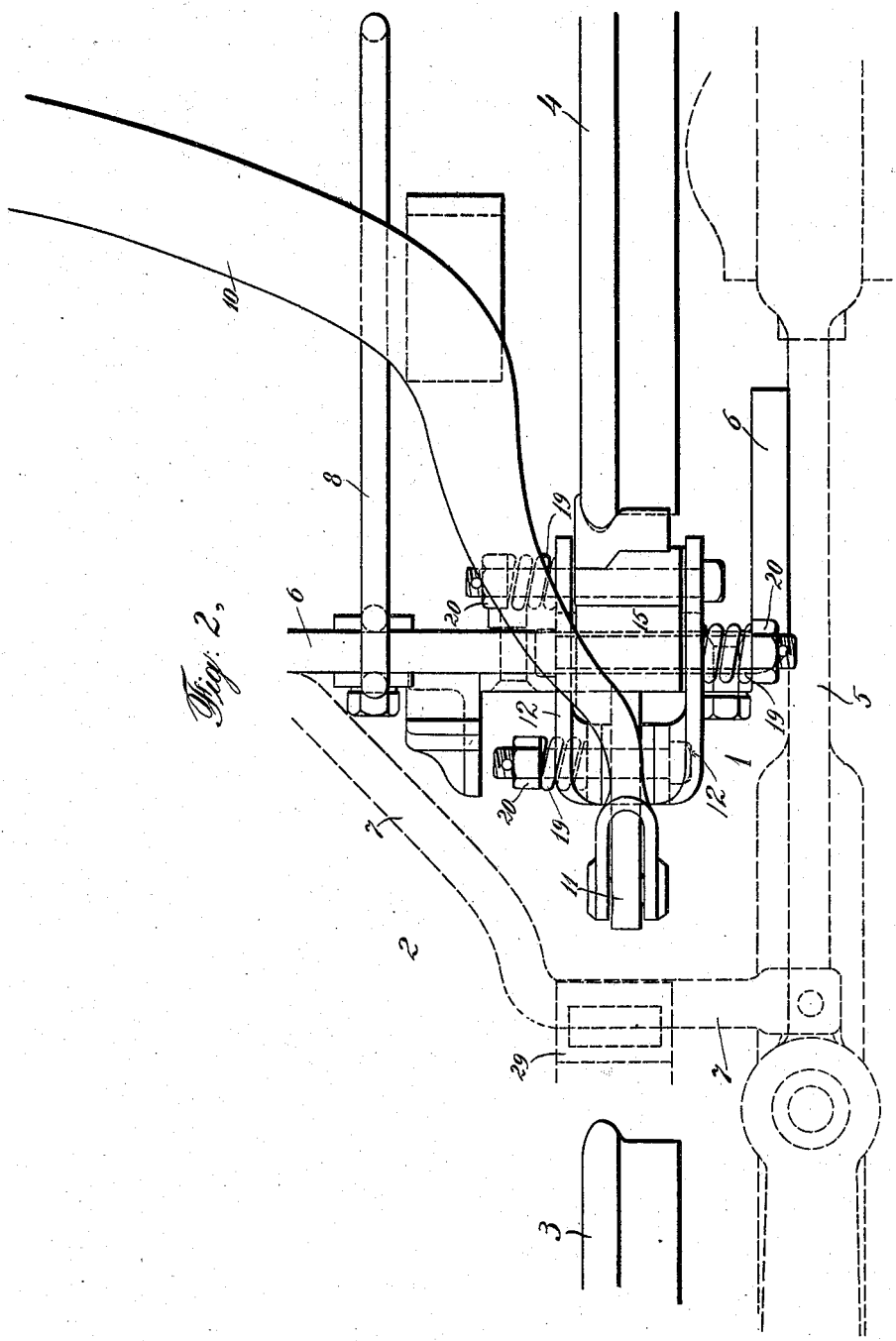

UNITED STATES PATENT OFFICE.

JOHN S. McWHIRTER, OF NEW YORK, N. Y., ASSIGNOR TO THE J. G. BRILL COMPANY, OF PHILADELPHIA, PENNSYLVANIA.

CAR-BRAKE.

No. 919,746.          Specification of Letters Patent.       Patented April 27, 1909.

Application filed September 30, 1908. Serial No. 455,536.

*To all whom it may concern:*

Be it known that I, JOHN S. McWHIRTER, a citizen of the United States, and a resident of the city, county, and State of New York, have invented a new and useful Improvement in Car-Brakes, of which the following is a specification.

The object of my invention is to provide a brake of this class which will be suitable for maximum traction trucks by means of which pressure is applied to the wheels in proportion to the loads carried by them. This object is accomplished by my invention, one embodiment of which will be described below.

For a more particular description of my invention, reference is to be had to the accompanying drawings forming a part hereof in which:

Figure 1 is a side elevation of my improved brake. Fig. 2 is a plan view of the same, only one side of the brake being shown, the other side being substantially identical therewith.

Throughout the various views of the drawings, similar reference characters designate similar parts.

My improved brake 1, is shown on a maximum traction truck 2 provided with the usual large driving wheels 3 and small trailing wheels 4 and the conventional side frame 5, together with the usual crossing 6 and brace 7 and horizontal lever rest 8. All these parts of the truck may be of the conventional form, as well as the other parts not shown and described.

My improved brake 1 has the usual horizontal lever 10 which at its upper end is pivoted in the conventional manner to the upright lever 11 which near its lower end is pivoted to a U-shaped lever 12 by means of the pivot 13. This U-shaped lever is fulcrumed at 14 over the crossing 6 and the fulcrum 14 has a bracket 15 fixed to said crossing. The U-shaped lever 12 has a downwardly extending arm near the trailing wheels 4 in which is a pivot 16 which pivots this lever to a brake shoe holder 17 in which is mounted a suitable brake shoe 18 of the conventional form.

The U-shaped lever 12 is preferably formed of two parts which run parallel or nearly parallel to each other on each side of the bracket 15 and upright lever 11. The pivots 13 and 16 and the fulcrum 14 are preferably formed of bolts on which are placed coil springs 19 and lock-nuts 20 so that the parts will be held in proper relation and that there will be no rattling.

The lower end of the upright lever 11 is provided with a third pivot 22 which connects this upright lever with the eye-bolt 23 which is provided with a lock-nut 24 which has ball-joints 25 with the brake shoe holder 26 which carries the brake shoe 27 that is adapted to rub against the large driving wheel 3. The brake shoe holder 26 is supported by a hanger 28 pivoted thereto and pivotally connected with a bracket 29 secured to the brake 7. To avoid complicating the drawings the brake shoe holder 26 and the parts connected with it are not shown in Fig. 2.

The operation of my improved brake is as follows: When the horizontal lever 10 is placed in tension, the upright lever 11 at its upper end is thrown to the right from the position shown in Fig. 1, thereby causing the pivot 13 to move to the right and the pivot 22 to move to the left. The U-shaped lever then forces the brake shoe 18 against the trailing wheel 4 and the eye-bolt 23 forces the brake shoe 27 against the large driving wheel 3 and the pressure applied to the wheels by the brake shoes is proportionate to the weight carried by the wheels.

While I have shown and described one embodiment of my invention, it is evident that it is not restricted thereto, but is broad enough to cover all structures that come within the scope of the annexed claims.

What I claim is:

1. In a device of the class described, an upright lever, a U-shaped lever connected with said upright lever, and having downwardly disposed arms, a brake shoe holder pivoted to one of said downwardly disposed arms, a second brake shoe holder and means for supporting the same, and means for connecting said second brake shoe holder with said upright lever.

2. In a device of the class described, an upright lever, a U-shaped lever pivoted thereto, and fulcrumed to means secured to a car truck, a brake shoe holder pivotally connected to said U-shaped lever, a second brake shoe holder and means for supporting the same, eye-bolt connected to said upright lever and a ball and socket joint between said eye-bolt and said last mentioned brake shoe holder.

3. In a device of the class described, an upright lever, a bracket and means for supporting the same, a U-shaped lever pivotally connected with said upright lever and fulcrumed to said bracket and a brake shoe holder connected with one end of said U-shaped lever, a second brake shoe holder and means for supporting the same, a ball and socket joint connecting said last mentioned brake shoe holder and an eye-bolt, said eye-bolt being pivotally connected with said upright lever.

Signed at the city, county and State of New York, this 29th day of Sept., 1908.

JOHN S. McWHIRTER.

Witnesses:
  GUS I. ARNOW,
  HARRY RADZINSKY.